US010366464B2

(12) United States Patent
Williamson

(10) Patent No.: US 10,366,464 B2
(45) Date of Patent: Jul. 30, 2019

(54) GENERATING INTERPOLATED INPUT DATA SETS USING REDUCED INPUT SOURCE OBJECTS

(75) Inventor: Eric Williamson, Willow Spring, NC (US)

(73) Assignee: Red Hat, Inc., Raleigh, NC (US)

( * ) Notice: Subject to any disclaimer, the term of this patent is extended or adjusted under 35 U.S.C. 154(b) by 701 days.

(21) Appl. No.: 12/955,768

(22) Filed: Nov. 29, 2010

(65) Prior Publication Data

US 2012/0136824 A1 May 31, 2012

(51) Int. Cl.
*G06F 17/30* (2006.01)
*G06Q 99/00* (2006.01)

(52) U.S. Cl.
CPC .................................... *G06Q 99/00* (2013.01)

(58) Field of Classification Search
None
See application file for complete search history.

(56) References Cited

U.S. PATENT DOCUMENTS 5,884,324 A * 3/1999 Cheng et al.
5,890,167 A 3/1999 Bridge, Jr. et al.
5,978,796 A 11/1999 Malloy et al.
6,360,188 B1 3/2002 Freidman et al.
6,366,922 B1 4/2002 Althoff
6,434,435 B1 8/2002 Tubel et al.
6,434,544 B1 8/2002 Bakalash et al.
6,552,681 B1 * 4/2003 Hayward et al. ........ 342/357.52
6,594,672 B1 7/2003 Lampson et al.
66,031,237 8/2003 Cazemier et al.
6,735,590 B1 5/2004 Shoup et al.
6,931,418 B1 8/2005 Barnes
7,152,062 B1 12/2006 Draper et al.
7,299,241 B2 11/2007 Reed et al.
7,472,127 B2 * 12/2008 Malloy et al.
(Continued)

FOREIGN PATENT DOCUMENTS

WO WO 03014963 A1 * 2/2003

OTHER PUBLICATIONS

Nielson, G.W., Scattered Data Modeling, IEEE Computer Graphics and Applications, vol. 13, No. 1 (Jan. 1993), pp. 60-70.*
(Continued)

*Primary Examiner* — Tyler J Torgrimson
(74) *Attorney, Agent, or Firm* — Lowenstein Sandler LLP

(57) ABSTRACT

Embodiments relate to systems and methods for generating interpolated input data sets using reduced input source objects. A database can store operational data, such as financial, climate or other information. A user can input or access a set of target data, representing output the user wishes to be generated from an interpolated set of input data based on an interpolation function. Thus, the average air temperature of a region may be known for the last ten years, along with other inputs such as water temperature, wind speed, etc. The target data can include an expected average temperature for the current year. The interpolation engine can receive the target temperature, and interpolate other climate inputs that will produce the target output temperature. The interpolation engine can also reduce the number of predetermined data objects or the dimensions of input data sets to generate interpolated inputs based on more compact inputs.

20 Claims, 9 Drawing Sheets

(56) References Cited

U.S. PATENT DOCUMENTS

| | | | |
|---|---|---|---|
| 7,660,822 | B1 | 2/2010 | Pfleger |
| 2001/0049678 | A1 | 12/2001 | Yaginuma |
| 2002/0029207 | A1 | 3/2002 | Bakalash et al. |
| 2002/0035562 | A1 | 3/2002 | Roller et al. |
| 2002/0083034 | A1 | 6/2002 | Orbanes et al. |
| 2002/0087516 | A1 | 7/2002 | Cras et al. |
| 2002/0169658 | A1 | 11/2002 | Adler |
| 2003/0114950 | A1 | 6/2003 | Ruth et al. |
| 2003/0115194 | A1 | 6/2003 | Pitts et al. |
| 2003/0115207 | A1 | 6/2003 | Bowman et al. |
| 2003/0120372 | A1 | 6/2003 | Ruth et al. |
| 2003/0126114 | A1 | 7/2003 | Tedesco |
| 2003/0184585 | A1 | 10/2003 | Lin et al. |
| 2003/0225736 | A1 | 12/2003 | Bakalash et al. |
| 2004/0039736 | A1 | 2/2004 | Kilmer et al. |
| 2004/0133552 | A1 | 7/2004 | Greenfield et al. |
| 2004/0139061 | A1 | 7/2004 | Colossi et al. |
| 2005/0004904 | A1 | 1/2005 | Kearney et al. |
| 2005/0010566 | A1 | 1/2005 | Cushing et al. |
| 2005/0060382 | A1 | 3/2005 | Spector et al. |
| 2006/0004833 | A1 | 1/2006 | Trivedi et al. |
| 2006/0036707 | A1 | 2/2006 | Singh et al. |
| 2006/0136462 | A1 | 6/2006 | Campos et al. |
| 2006/0262145 | A1 | 11/2006 | Zhang et al. |
| 2007/0022093 | A1 | 1/2007 | Wyatt et al. |
| 2007/0027904 | A1 | 2/2007 | Chow et al. |
| 2007/0088757 | A1 | 4/2007 | Mullins et al. |
| 2007/0094236 | A1 | 4/2007 | Otter et al. |
| 2007/0208721 | A1 | 9/2007 | Zaman et al. |
| 2008/0140696 | A1 | 6/2008 | Mathuria |
| 2008/0172405 | A1 | 7/2008 | Feng et al. |
| 2008/0243778 | A1 | 10/2008 | Behnen et al. |
| 2008/0294596 | A1 | 11/2008 | Xiong |
| 2008/0320023 | A1 | 12/2008 | Fong |
| 2009/0193039 | A1 | 7/2009 | Bradley et al. |
| 2009/0222470 | A1 | 9/2009 | Kemp et al. |
| 2010/0057700 | A1 | 3/2010 | Williamson |
| 2010/0057777 | A1 | 3/2010 | Williamson |
| 2010/0131456 | A1 | 5/2010 | Williamson |
| 2010/0169299 | A1 | 7/2010 | Pollara |
| 2010/0305922 | A1 | 12/2010 | Williamson |
| 2010/0306254 | A1 | 12/2010 | Williamson |
| 2010/0306255 | A1 | 12/2010 | Williamson |
| 2010/0306272 | A1 | 12/2010 | Williamson |
| 2010/0306281 | A1 | 12/2010 | Williamson |
| 2010/0306340 | A1 | 12/2010 | Williamson |
| 2010/0306682 | A1 | 12/2010 | Williamson |
| 2011/0050728 | A1 | 3/2011 | Williamson |
| 2011/0054854 | A1 | 3/2011 | Williamson |
| 2011/0055680 | A1 | 3/2011 | Williamson |
| 2011/0055761 | A1 | 3/2011 | Williamson |
| 2011/0055850 | A1 | 3/2011 | Williamson |
| 2011/0078199 | A1 | 3/2011 | Williamson |
| 2011/0078200 | A1 | 3/2011 | Williamson |
| 2011/0131176 | A1 | 6/2011 | Wiliiamson |
| 2011/0131220 | A1 | 6/2011 | Williamson |
| 2011/0158106 | A1 | 6/2011 | Williamson |
| 2011/0161282 | A1 | 6/2011 | Williamson |
| 2011/0161374 | A1 | 6/2011 | Williamson |
| 2011/0161378 | A1 | 6/2011 | Williamson |

OTHER PUBLICATIONS

Tremblay et al., Interpolation of animal tracking data in a fluid environment, The Journal of Experimental Biology 209, 128-140, Published by The Company of Biologists 2006, published Jan. 1, 2006, retrieved on Jul. 16, 2013, retrieved from he Internet at <URL: http://jeb.biologists.org/content/209/1/128.full.pdf+html>.*

Tremblay et al., Interpolation of animal tracking data in a fluid environment, The Journal of Experimental Biology 209, 128-140, Published by The Company of Biologists 2006, published Jan. 1, 2006, retrieved on Jul. 16, 2013, retrieved from the Internet at <URL: http://jeb.biologists.org/content/209/1/128.full.pdf+html>.*

Heath, M.T., Scientific Computing an Introductory Survey, McGraw Hill, 2002, pp. 310,332.*

Using OLAP and Multi-Dimensional data for decision making, Hasan et al. IEEE 2001.

A new OLAP aggregation based on the AHC technique, Massaoud et al, DOLAP'04 Nov. 12-13, 2004.

Interactive hierarchical dimension ordering, spacing and filtering for exploration of high dimension datasets, Yang et al, IEEE symposium on information visualization 2003.

Williamson, "Systems and Methods for Interpolating Conformal Input Sets Based on a Target Output", U.S. Appl. No. 12/872,779, filed Aug. 31, 2010.

Williamson, "Systems and Methods for Interpolating Alternative Input Sets Based on User-Weighted Variables", U.S. Appl. No. 12/951,881, filed Nov. 22, 2010.

Williamson, "Systems and Methods for Tracking Differential Changes in Conformal Data Input Sets", U.S. Appl. No. 12/951,937, filed Nov. 22, 2010.

Williamson, "Systems and Methods for Training a Self-Learning Network Using Interpolated Input Sets Based on a Target Output", U.S. Appl. No. 12/872,935, filed Aug. 31, 2010.

Williamson, "Systems and Methods for Embedding Interpolated Data Object in Application Data File", U.S. Appl. No. 12/955,717, filed Nov. 29, 2010.

Williamson, "Systems and Methods for Validating Interpolation Resulsts Using Mote Carlo Simulations on Interpolated Data Inputs", U.S. Appl. No. 13/037,344, filed Feb. 28, 2011.

Williamson, "Systems and Methods for Filtering Interpolated Input Data Based on User-Supplied or Other Approximation Constraints", U.S. Appl. No. 12/955,790, filed Nov. 29, 2010.

Williamson, "Systems and Methods for Binding Multiple Interpolated Data Objects", U.S. Appl. No. 12/955,811, filed Nov. 29, 2010.

Williamson, "Systems and Methods for Generating Portable Interpolated Data Using Object Based Encodig of Interpolated Results", U.S. Appl. No. 13/037,322, filed Feb. 28, 2011.

Williamson, "Systems and Methods for Generating Interpolation Data Template to Normalize Analytic Runs", U.S. Appl. No. 13/037,332, filed Feb. 28, 2011.

Williamson, "Systems and Methods for Generating Interpolation Data Sets Converging to Optimized Results Using Iterative Overlapping Inputs", U.S. Appl. No. 13/037,341, filed Feb. 28, 2011.

ASPFAQ.com, "What are the valid styles for converting datetime to string?", (2006) http://database.aspfaq.com/database/what-are-the-valid-styles-for-converting-datetime-to-string.html.

Answering Joint Queries from Multiple Aggregate OLAP Databases, Pourabbas et al, LNCS 2737, pp. 24-34, 2003.

* cited by examiner

GENERATING INTERPOLATED INPUT DATA SETS USING REDUCED INPUT SOURCE OBJECTS

FIELD

The invention relates generally to systems and methods for generating interpolated input data sets using reduced input source objects, and more particularly, to platforms and techniques for receiving known or predetermined sets of input data as well as target output data, and generating a subset of the input data having fewer dimensions or total data objects that produces interpolated sets of remaining input data of at least approximately the same quality or accuracy of the full input set.

BACKGROUND

In the fields of computational modeling and high performance computing, modeling platforms are known which contain a modeling engine to receive a variety of modeling inputs, and then generate a precise modeled output based on those inputs. In conventional modeling platforms, the set of inputs are precisely known, and the function applied to the modeling inputs is precisely known, but the ultimate results produced by the modeling engine are not known until the input data is supplied and the modeling engine is run. For example, in an econometric modeling platform, inputs for a particular industry like housing can be fed into a modeling engine. Those inputs can include, for instance, prevailing finance rates, employment rates, average new-home costs, costs of building materials, rate of inflation, and other economic or other variables that can be fed into the modeling engine which is programmed or configured to accept those inputs, apply a function or other processing to those inputs, and generate an output such as projected new-home sales for a given period of time. Those results can then be used to analyze or forecast other details related to the subject industry, such as predicted sector profits or employment.

In many real-life analytic applications, however, the necessary inputs for a given subject or study may not be known, while, at the same time, a desired or target output may be known or estimated with some accuracy. For instance, the research and development (R&D) department of a given corporation may be fixed at the beginning of a year or other budget cycle, but the assignment or allocation of that available amount of funds to different research teams or product areas may not be specified by managers or others. In such a case, an analyst may have to manually estimate and "back out" distributions of budget funds to different departments to begin to work out a set of component funding amounts that will, when combined, produce the already-known overall R&D or other budget. In performing that interpolation, the analyst may or may not be in possession of some departmental component budgets which have themselves also been fixed, or may or may not be in possession of the computation function which will appropriately sum or combine all component funds to produce the overall predetermined target budget. Adjustment of one component amount by hand may cause or suggest changes in other components in a ripple effect, which the analyst will then have to examine or account for in a further iteration of the same manual estimates.

According to further regards, the set of predetermined input data from which the interpolated inputs or other missing variables are derived, may present computational burdens or challenges for the interpolation engine perform the interpolation actions. In aspects, the derivation of an interpolation function and corresponding interpolated inputs may require significant computational bandwidth when the set of predetermined input data is large, for example, on the order of thousands, tens of thousands, hundreds of thousands, or other amounts or levels of data objects. The computational requirements can also be burdensome when the set of predetermined input data upon which interpolation operations are conducted are stored or encapsulated are, in addition or instead, two-dimensional, three-dimensional, or other higher-dimensional data structures requiring rotations or computations around multiple axes.

In yet further aspects, the size, length, total data object count, and/or dimensions of a set of predetermined input data in cases can include segments, sections, or dimensions of data which adversely affect the accuracy or quality of interpolation operations. This can occur, for example, when one or more lists, entries, values, rows, columns, planes, dimensions, and/or other subsets of the predetermined input data include corrupt or inaccurate data values. In cases where faulty data values are embedded within some subset of the predetermined input data, those values may drive the results of the interpolation operations toward skewed or inaccurate results, without a way to selectively remove or delete those data objects or entries.

It may be desirable to provide systems and methods for generating interpolated input data sets using reduced input source objects, in which a user can access or specify a desired or predetermined target output in an analytic system, provide or access a set of predetermined or known input data, and derive a reduced set of predetermined input data capable of producing at least approximately the same quality or accuracy of the full input set.

DESCRIPTION

Figure 1:
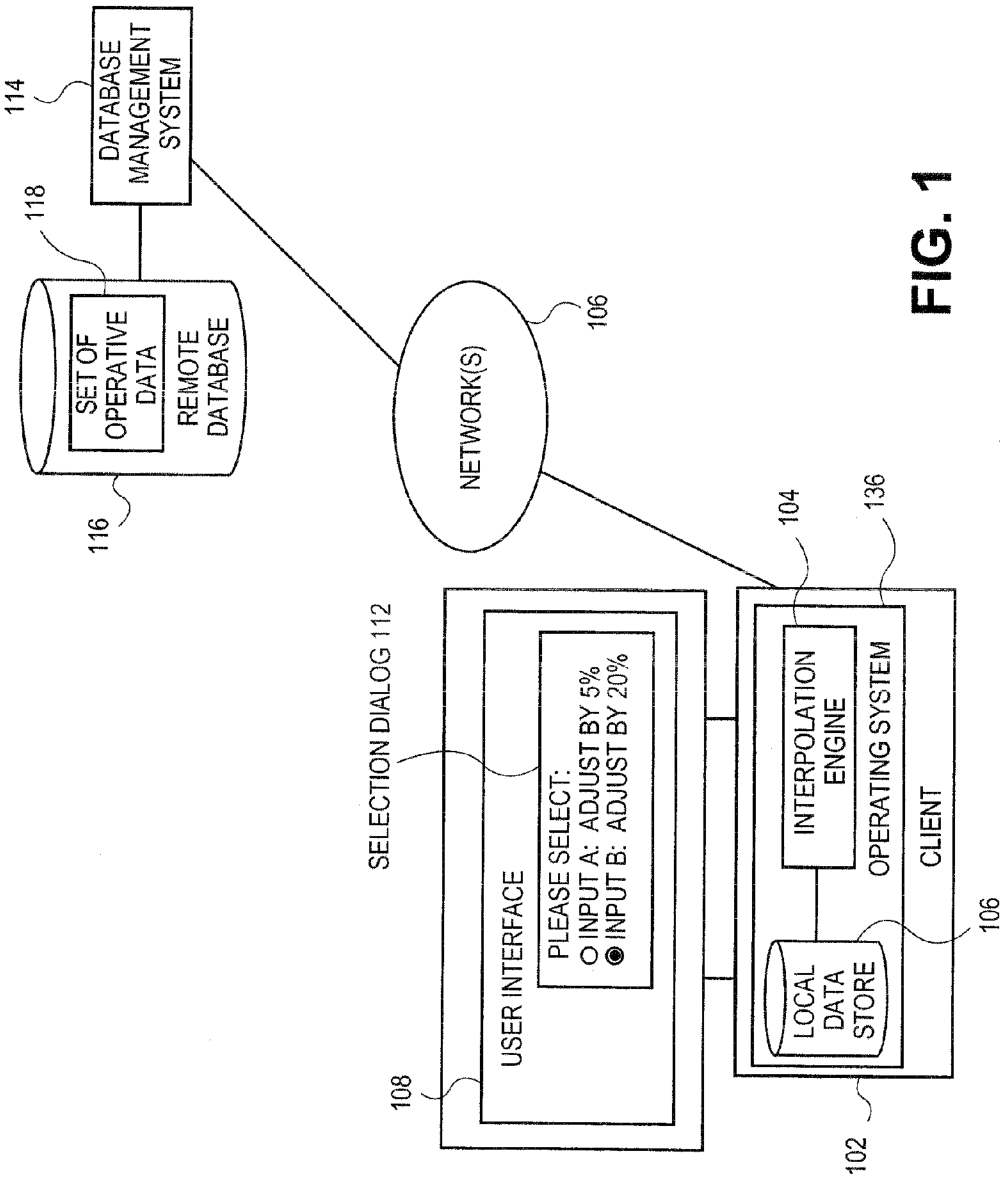
FIG. 1 illustrates an overall network architecture in which systems and methods for generating interpolated input data sets using reduced input source objects can be practiced, according to various embodiments of the present teachings.

Embodiments relate to systems and methods for generating interpolated input data sets using reduced input source objects. More particularly, embodiments relate to platforms and techniques for accessing a set of historical, operational, archival, or other operative data related to captured technical, financial, medical, or other operations, and supplying that operative data to an interpolation engine or platform. In addition, the interpolation engine can be supplied With or can access a set of target output data, for purposes of generating a set of estimated, approximated, inferred, or otherwise interpolated inputs that can be supplied to the interpolation engine to produce the target output. Thus, for instance, in an illustrative context of a climate modeling platform, a collection or set of historical input data, such as ocean temperatures, air temperatures, land temperatures, average wind speed and direction, average cloud cover, and/or other inputs or factors can be accessed or retrieved from a data store. The data store can for instance include records of those or other variables for each year of the last ten years, along with an output or result associated with those inputs, such as ocean level or polar cap area for each of those years or other series. In aspects, a partial set or subset of predetermined or fixed values for the same inputs can be supplied to the interpolation engine, such as predicted or assumed arctic temperatures, for the current year.

The interpolation engine can also receive a set of target output data, such as the expected or projected ocean level or polar cap area for the current year. According to embodiments, the interpolation engine can then generate an interpolation function, and generate a set of interpolated inputs, such as air temperature, land temperature, average wind speed and direction, average cloud cover, and/or other remaining inputs whose values are unspecified, but which can be interpolated to produce values which when supplied as input to the interpolation engine can produce the set of target output data. In cases, the interpolation engine can generate different combinations of the set of interpolated input data in different generations or series, to permit an analyst or other user to manipulate the input values, to observe different ramifications of different component values for the set of interpolated inputs. The user can be presented with a selector dialog or other interface to manipulate the set of interpolated input values, and select or adjust those values and/or the interpolation function used to generate those values. The analyst or other user can thereby determine scenarios and potential inputs that will combine to realize the desired solution in the form of the set of target output data, and the values conformally producing that output can be varied or optimized.

In aspects in further regards, the interpolation engine and/or other logic as well as user selection and/or other factors can be used to remove or reduce the total number of data objects, and/or the number of dimensions, of the set of predetermined input data used in interpolation operations. In aspects, the interpolation engine, other logic, and/or the user can analyze the constituent data objects and/or dimensions of the set of predetermined input data, and systematically and/or selectively remove, delete, null, and/or otherwise reduce the number and/or dimensions of the data objects or their associated data structure. The interpolation engine and/or other logic can then generate interpolation results, including interpolated input values, based on the set or sets of reduced predetermined input data. In aspects, the interpolation engine and/or other logic can evaluate or analyze the resulting set of interpolated input data, for instance, to determine the consistency of those interpolated results compared to the same interpolated variables or inputs that are generated using the full or unaltered complement of the set of predetermined input data. The ability to analyze and derive input sets that will produce already-known or fixed output can thereby be automated in whole or part, permitting a user to investigate a broader array of analytic scenarios more efficiently and effectively, and to develop reduced or decimated sets of fixed or predetermined input data which still produced interpolation results that are satisfactory compared to employing the full complement, size, or spectrum of known input data. In addition, the ability to generate selective subsets or other reduced versions of the set of predetermined input data while maintaining the quality, accuracy, range, and/or nature of the interpolated input data can permit more efficient and/or more accurate interpolation operations, in different scenarios.

In embodiments as shown in FIG. 1, in accordance with embodiments of the invention, a user can operate a client 102 which is configured to host an interpolation engine 104, to perform interpolation and other analytic operations as described herein. In aspects, while embodiments are described in which interpolation engine 104 is described to operate on historical data to interpolate or fill in missing values or parameters, in embodiments, it will be understood that interpolation engine 104 can in addition or instead operate to produce extrapolated data, reflected expected future values of inputs and/or outputs. In aspects, the client 102 can be or include a personal computer such as a desktop or laptop computer, a network-enabled cellular telephone, a network-enabled media player, a personal digital assistant, and/or other machine, platform, computer, and/or device. In aspects, the client 102 can be or include a virtual machine, such as an instance of a virtual computer hosted in a cloud computing environment. In embodiments as shown, the client 102 can host or operate an operating system 136, and can host or access a local data store 106, such as a local hard disk, optical or solid state disk, and/or other storage. The client 102 can generate and present a user interface 108 to an analyst or other user of the client 102, which can be a graphical user interface hosted or presented by the operating system 136. In aspects, the interpolation engine 104 can generate a selection dialog 112 to the user via the user interface 108, to present the user with information and selections related to interpolation and other analytic operations.

In embodiments as likewise shown, the client 102 and/or interpolation engine 104 can communicate with a remote database management system 114 via one or more networks 106. The one or more networks 106 can be or include the Internet, and/or other public or private networks. The database management system 114 can host, access, and/or be associated with a remote database 116 which hosts a set of operative data 118. In aspects, the database management system 114 and/or remote database 118 can be or include remote database platforms such the commercially available Oracle™ database, an SQL (structured query language) database, an XML (extensible markup language) database, and/or other storage and data management platforms or services. In embodiments, the connection between client 102 and/or the interpolation engine 104 and the database management system 114 and associated remote database 116 can be a secure connection, such as an SSL (secure socket layer)

connection, and/or other connection or channel. The interpolation engine 104 can access the set of operative data 118 via the database management system 114 and/or the remote database 116 to operate, analyze, interpolate and map the set of operative data 118 and other data sets to produce or conform to a set of target output data 120. In aspects, the predetermined or already-known set of target output data 120 can be stored in set of operative data 118, can be received as input from the user via selection dialog 112, and/or can be accessed or retrieved from other sources.

Figure 2A:
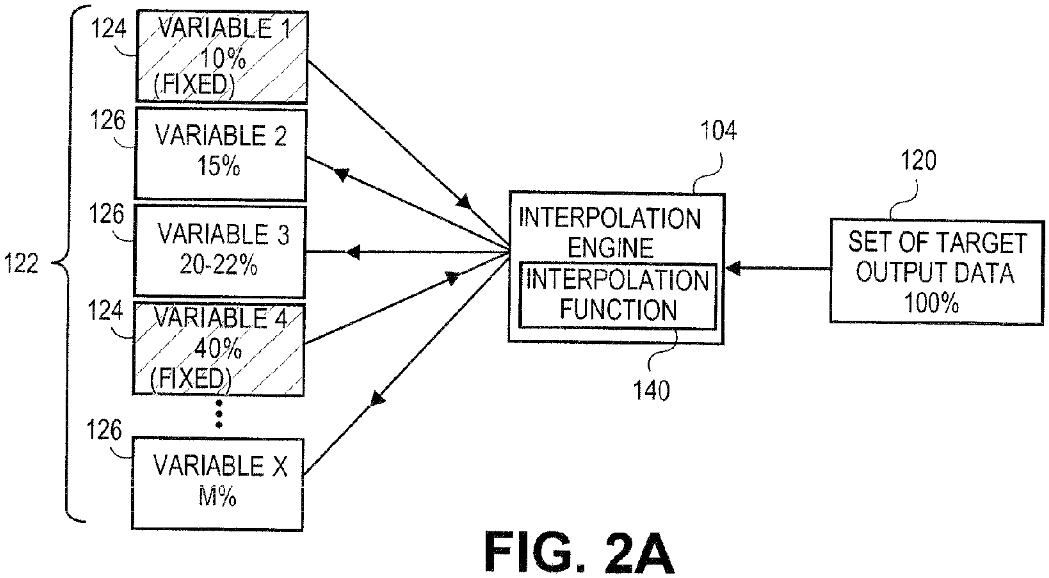
FIGS. 2A-2C illustrate various exemplary sets of input data, and series of sets of input data, that can be used in or produced by systems and methods for generating interpolated input data sets using reduced input source objects, according to various embodiments.
Figure 2B:
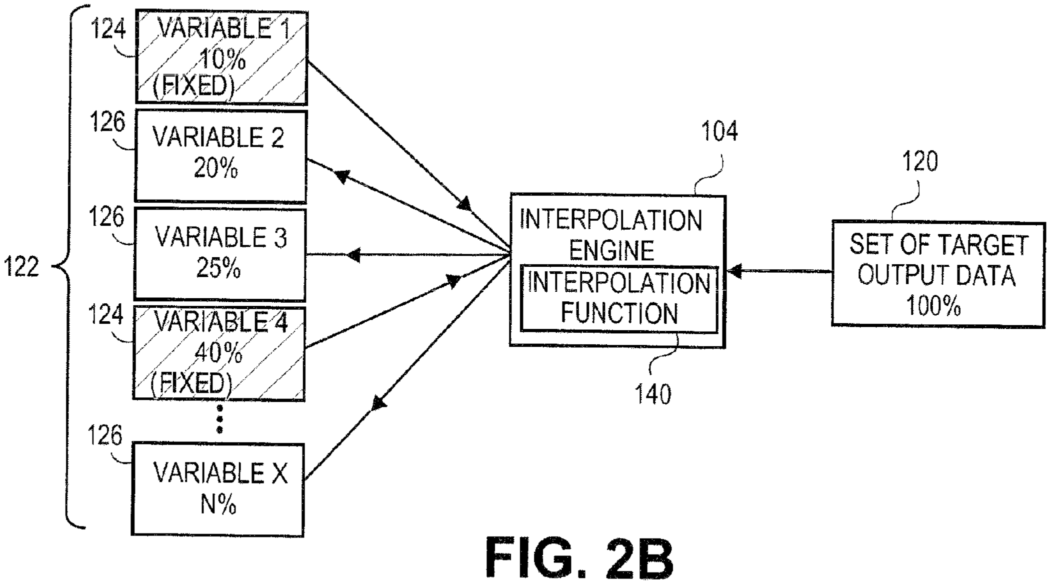
Figure 2C:
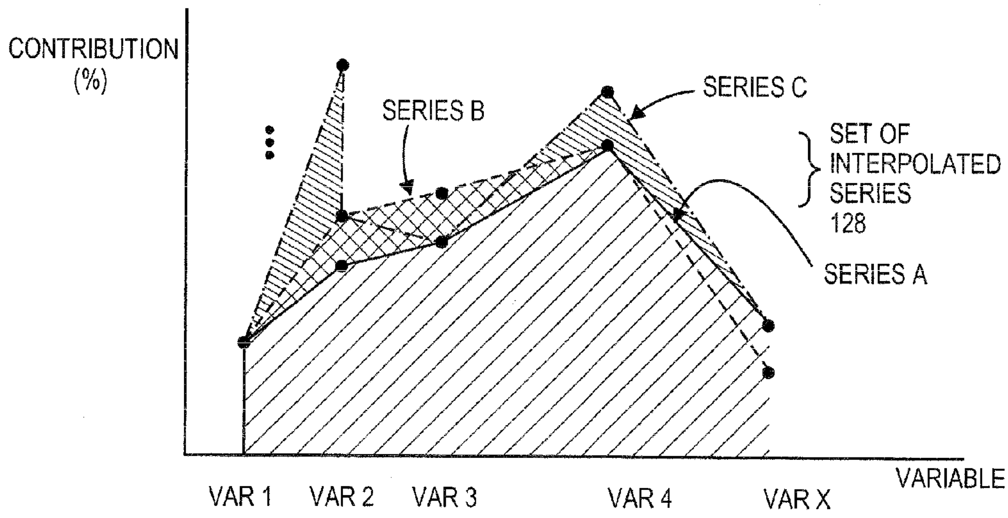

In embodiments, and as shown in FIGS. 2A-2C, the interpolation engine 104 can, in general, receive the set of target output data 120, and operate on that data to produce a conformal mapping of a set of combined input data 122 to generate an output of the desired set of target output data. As for instance shown in FIG. 2A, the set of combined input data 122 can, in cases, comprise at least two component input data sets or subsets. in aspects as shown, the set of combined input data 122 can comprise or contain a set of predetermined input data 124. The set of predetermined input data 124 can consist of data that is predetermined or already known or captured, for instance by accessing the set of operative data 118, and/or by receiving that data from the user as input via the selection dialog 112. In aspects, the set of predetermined input data 124 can include variables or other data which are already known to the user, to other parties, or has already been fixed or captured. In the case of a medical epidemiology study, for example, the set of predetermined input data 124 can include the number of vaccination doses available to treat an influenza or other infectious agent. For further example, in cases where the set of combined input data 122 represents the components of a corporate or government financial budget, the set of predetermined input data 124 can reflect the percentages (as for instance shown), for example to be allocated to different departments or agencies. It will be appreciated that other percentages, contributions, expressions, and/or scenarios or applications can be used.

In aspects, the interpolation engine 104 can access and process the set of predetermined input data 124 and the set of target output data 120, to generate a set of interpolated input data 126 which can produce the set of target output data 120 via an interpolation function 104. For instance, if the set of target output data 120 represents a total budget amount for an entity, then the set of interpolated input data 126 can reflect possible, approximate, or suggested values or percentages of that total funded amount that the interpolation engine 104 can allocate to various departments, using the interpolation function 140. Again, as noted the interpolation function 140 can be determined by interpolation engine 104 to generate the set of target output data 120, as predetermined by the user or otherwise known or fixed. In embodiments, interpolation techniques, functions, and/or other related processing as described in co-pending U.S. application Ser. No. 12/872,779, entitled “Systems and Methods for Interpolating Conformal Input Sets Based on a Target Output,” filed on Aug. 31, 2010, having the same inventor as this application, assigned or under obligation of assignment to the same entity as this application, and incorporated by reference in its entirety herein, can be used in determining interpolation function 140, configuring and/or executing interpolation engine 104, and/or performing other related operations.

The following applications, scenarios, applications, or illustrative studies will illustrate the interpolation action or activity that may be performed by the interpolation engine 104, according to various embodiments. In cases, again merely for illustration of exemplary interpolation analytics, the set of operative data 118 can be or include data related to medical studies or information. Thus for instance, the set of operative data 118 can include data for a set or group of years that relate to public health issues or events, such as the population-based course of the influenza seasons over that interval. The set of operative data can include variables or inputs that were captured or tracked for the influenza infection rate in the population for each year over the given window. Those variables or inputs can be or include, for instance, the percentage of the population receiving a public vaccine by Week 10 of the flu season, e.g. 20%, the age cohorts of the patients receiving the vaccine, the strain of the influenza virus upon which the vaccine is based, e.g. H5N5, the infectivity or transmission rate for a given infected individual, e.g. 3%, the average length of infectious illness for the infected population, e.g. 10 days, and/or other variables, metrics, data or inputs related to the epidemiology of the study. In aspects, the output or result of those tracked variables can be the overall infection rate for the total population at peak or at a given week or other time point, such as 40%. Other outputs or results can be selected. Those inputs and output(s) can be recorded in the set of operative data 118 for a set or group of years, such as for each year of 2000-2009, or other periods. In aspects, data so constituted can be accessed and analyzed, to generate interpolated data for current year 2010, although the comparable current inputs are not known or yet collected. In the current year (assumed to be 2010), one or more of the set of predetermined variables 124 may be known, such as, for instance, the vaccination rate of because yearly stocks are known or can be reliably projected, e.g. at 25%. In addition, an analyst or other user may specify a set of target output data 120 that can include the overall infection rate for the population the year under study, such as 35% at peak. In cases of this illustrative type, the interpolation engine 104 can access or receive the overall infection rate (35% peak) as the set of predetermined output data 120 or a part of that data, as well as the vaccination rate (25%) as the set of predetermined input data 124 or part of that data. In aspects, the interpolation engine 104 can access the collected historical data (for years 2000-2009) to analyze that data, and generate an interpolation function 140 which operates on the recorded inputs to produce the historical outputs (overall infection rate), for those prior years, either to exact precision, approximate precision, and/or to within specified margins or tolerance. The interpolation engine 104 can then access or receive the set of target output data 120 for the current (2010) year (35% peak infection), the set of predetermined input data (25% vaccination rate), and/or other variables or data, and utilize the interpolation function 140 to generate the set of interpolated input data 126. In the described scenario, the set of interpolated input data 125 generated or produced by the interpolation engine 104 can include the remaining unknown, speculative, uncollected, or otherwise unspecified inputs, such as the percentage of the population receiving a public vaccine by Week 10 of the flu season, e.g. 25%, the age cohorts of the patients receiving the vaccine, the strain of the influenza virus upon which the vaccine is based, e.g. H1N5, the infectivity or transmission rate for a given infected individual, e.g. 4%, the average length of infectious illness for the infected population, e.g. 9 days, and/or other variables, metrics, data or inputs. In aspects, the interpolation engine 104 can generate or decompose the set of interpolated input data 126 to produce the set of target output data 120 (here 35% peak infection) to exact or arbitrary precision, and/or to within a specified margin or tolerate, such as 1%. Other inputs, outputs, applications, data, ratios and functions can be used or analyzed using the systems and techniques of the present teachings.

In embodiments, as noted the interpolation function 140 can be generated by the interpolation engine 104 by examining the same or similar variables present in the set of operative data 118, for instance, medical data as described, or the total fiscal data for a government agency or corporation for a prior year or years. In such cases, the interpolation engine 104 can generate the interpolation function 140 by assigning the same or similar categories of variables a similar value as the average of prior years or sets of values for those same variables, and then perform an analytic process of those inputs to derive set of target output data 120 as currently presented. The interpolation engine 104 can, for example, apply a random perturbation analysis to the same variables from prior years, to produce deviations in amount for each input whose value is unknown and desired to be interpolated. When combinations of the set of predetermined input data 124 and set of interpolated input data 126 are found which produce the set of target output data 120, or an output within a selected margin of set of target output data 120, the user can operate the selection dialog 112112 or otherwise respond to accept or fix those recommended or generated values.

In cases, and as for instance illustrated in FIG. 2B, the set of combined input data 122 can be generated to produce the set of target output data 120 may not be unique, as different combinations of the set of predetermined input data 124 and set of interpolated input data 126 can be discovered to produce the set of target output data 120 either exactly, or to within specified tolerance. In such cases, different versions, generations, and/or series of set of combined input data 122 can be generated that will produce the set of target output data 120 to equal or approximately equal tolerance. For example, in cases where the set of operative data 118 relates to an epidemiological study, it may be found that a limit of 20 million cases of new infection during a flu season can be produced as the set of target output data 120 by applying 40 million doses of vaccine at week 6 of the influenza season, or can be produced as a limit by applying 70 million doses of vaccine at week 12 of the same influenza season. Other variables, operative data, ratios, balances, interpolated inputs, and outputs can be used or discovered. In embodiments as noted and as shown in FIG. 2C, when the possible conformal set of interpolated inputs 126 is not unique, the interpolation engine 104 can generate a set of interpolated series 128, each series containing a set of interpolated input data 126 which is different and contains potentially different interpolated inputs from other conformal data sets in the series of interpolated input sets 128. In cases where such alternatives exist, the interpolation engine 104 can generate and present the series of interpolated input sets 128, for instance, in series-by-series graphical representations or otherwise, to select, compare, and/or manipulate the results and values of those respective data sets. In embodiments, the analyst or other user may be given a selection or opportunity to choose one set of interpolated input data 126 out of the series of interpolated input sets 128 for use in their intended application, or can, in embodiments, be presented with options to continue to analyze and interpolate the set of operative data 118, for example to generate new series in the series of interpolated input sets 128. Other processing options, stages, and outcome selections are possible.

FIG. 3 illustrates an exemplary diagram of hardware and other resources that can be incorporated in a client 102 that can host or be used in connection with systems and methods for interpolating conformal input sets based on a target output, according to embodiments. In aspects, the client 102 can be or include a personal computer, a network enabled cellular telephone, or other networked computer, machine, or device. In embodiments as shown, the client 102 can comprise a processor 130 communicating with memory 132, such as electronic random access memory, operating under control of or in conjunction with operating system 136. Operating system 136 can be, for example, a distribution of the Linux™ operating system, the Unix™ operating system, or other open-source or proprietary operating system or platform. Processor 130 can also communicate with the interpolation engine 104 and/or a local data store 138, such as a database stored on a local hard drive. Processor 130 further communicates with network interface 134, such as an Ethernet or wireless data connection, which in turn communicates with one or more networks 106, such as the Internet or other public or private networks. Processor 130 also communicates with database management system 114 and/or remote database 116, such as an Oracle™ or other database system or platform, to access set of operative data 118 and/or other data stores or information. Other configurations of client 102, associated network connections, storage, and other hardware and software resources are possible. In aspects, the database management system 114 and/or other platforms can be or include a computer system comprising the same or similar components as the client 102, or can comprise different hardware and software resources.

Figure 3A:
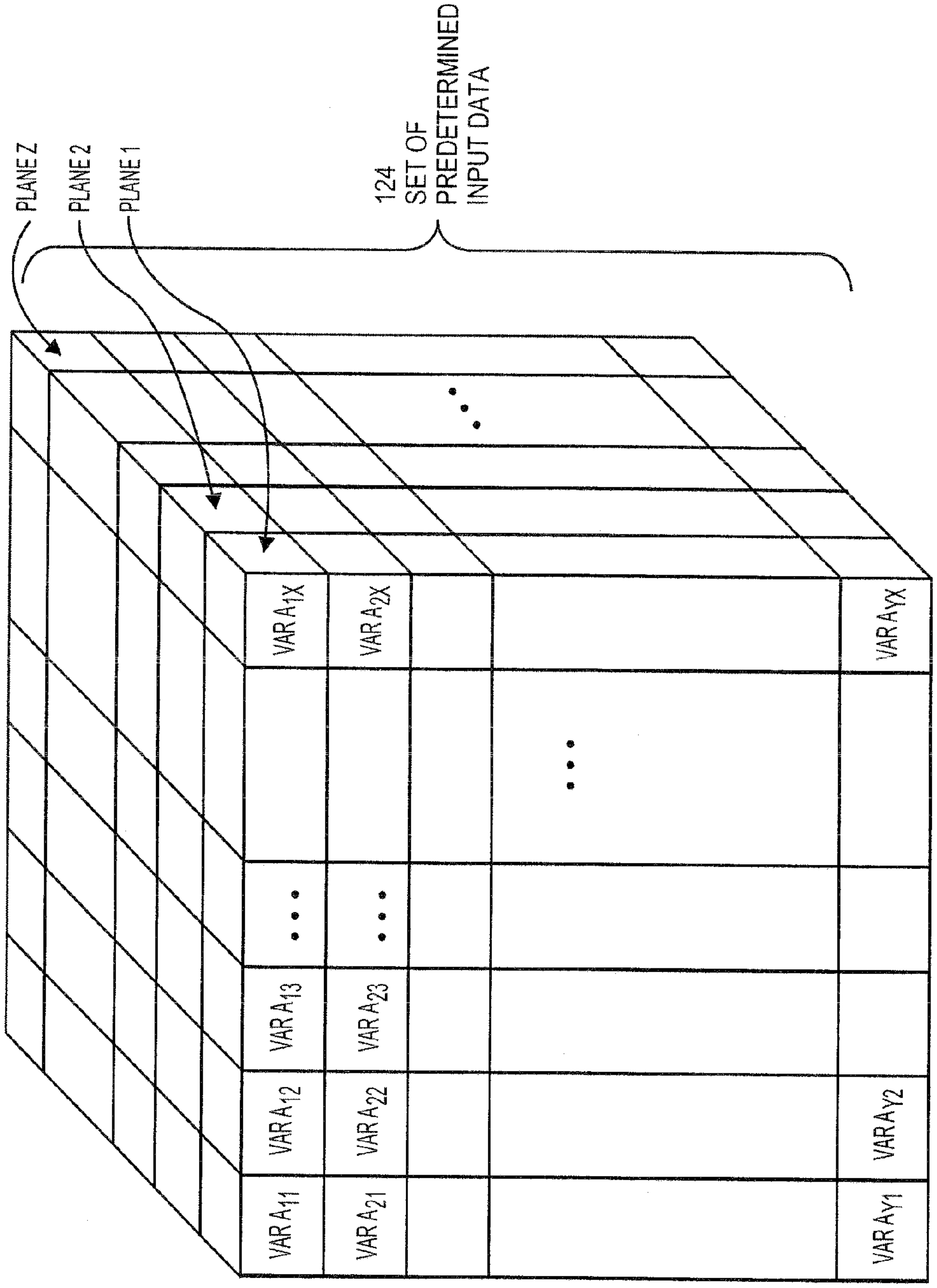
FIGS. 3A-3C illustrate various exemplary sets of input data, reduced input data, and analytic operations on the resulting interpolated input values that can be used in or produced by systems and methods for generating interpolated input data sets using reduced input source objects, according to various embodiments.
Figure 3B:
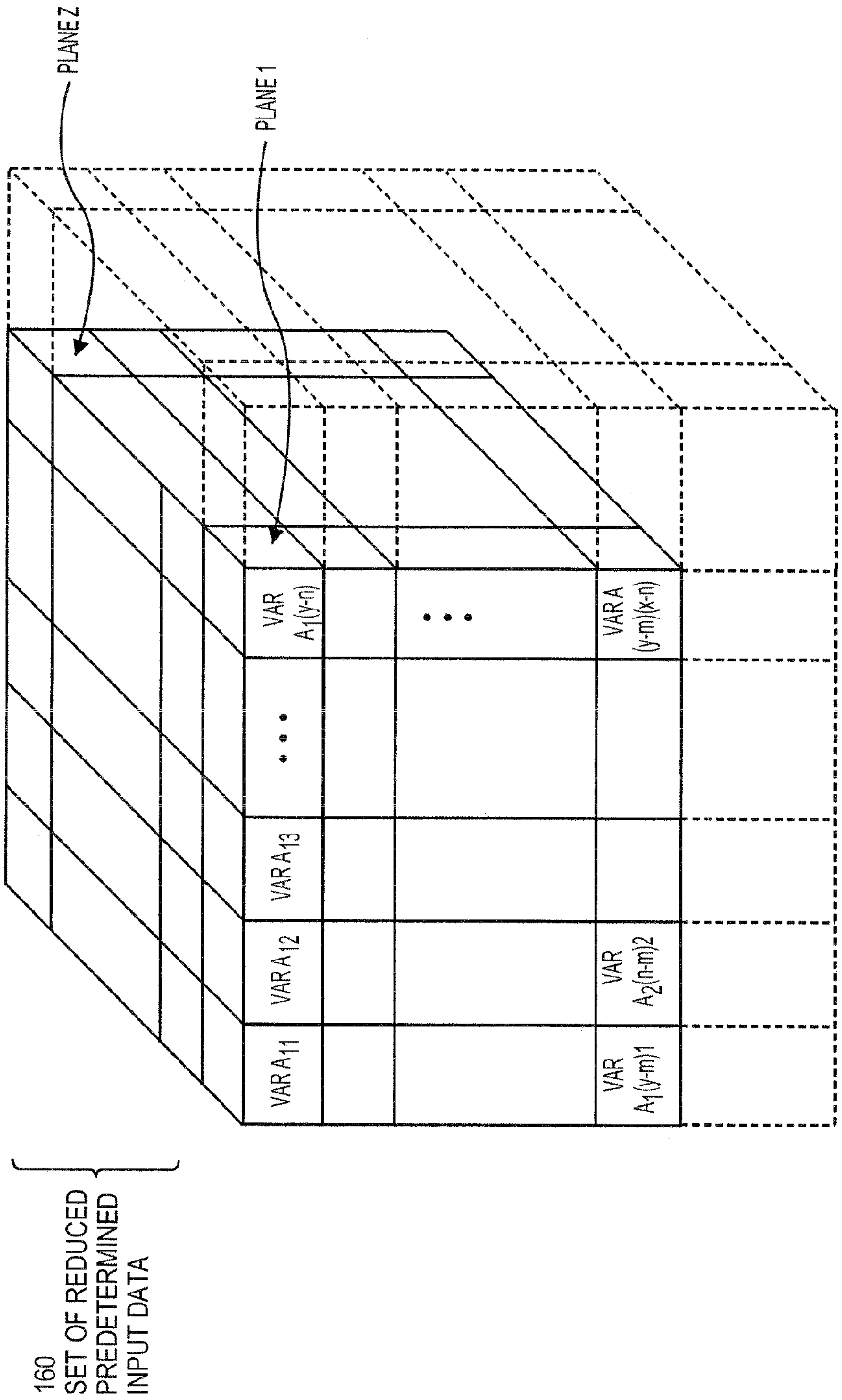
Figure 3C:
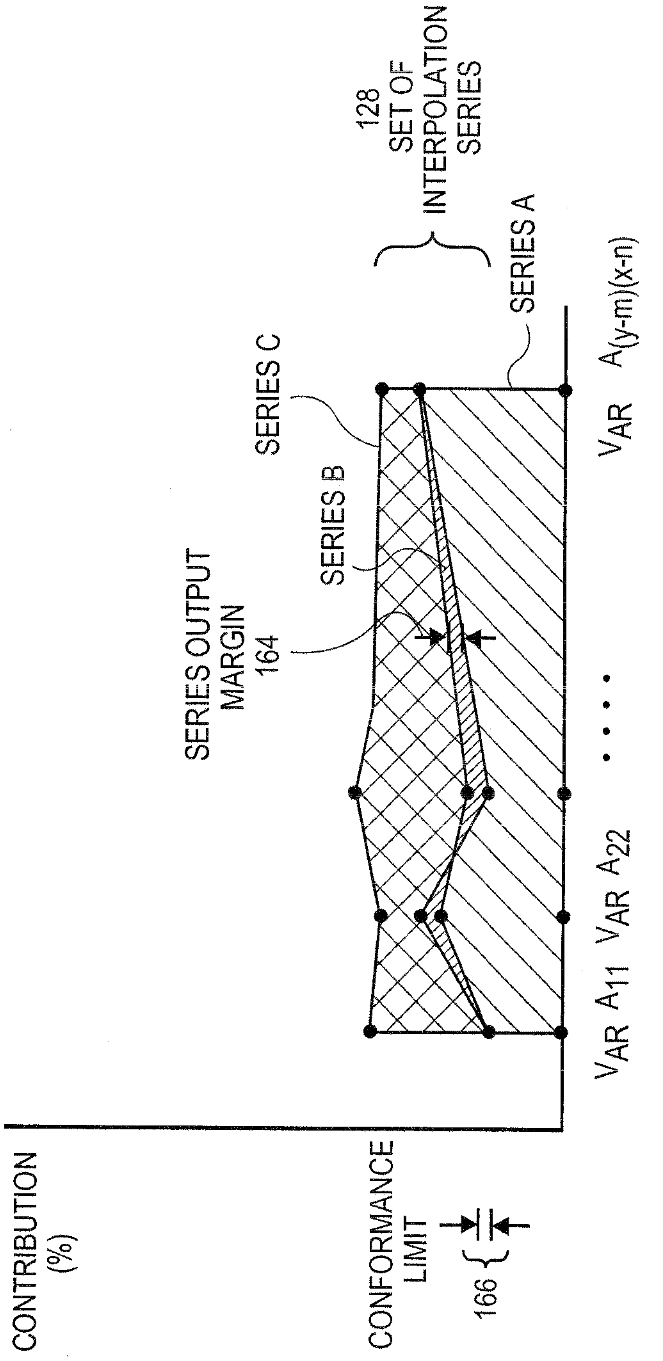
Figure 4:
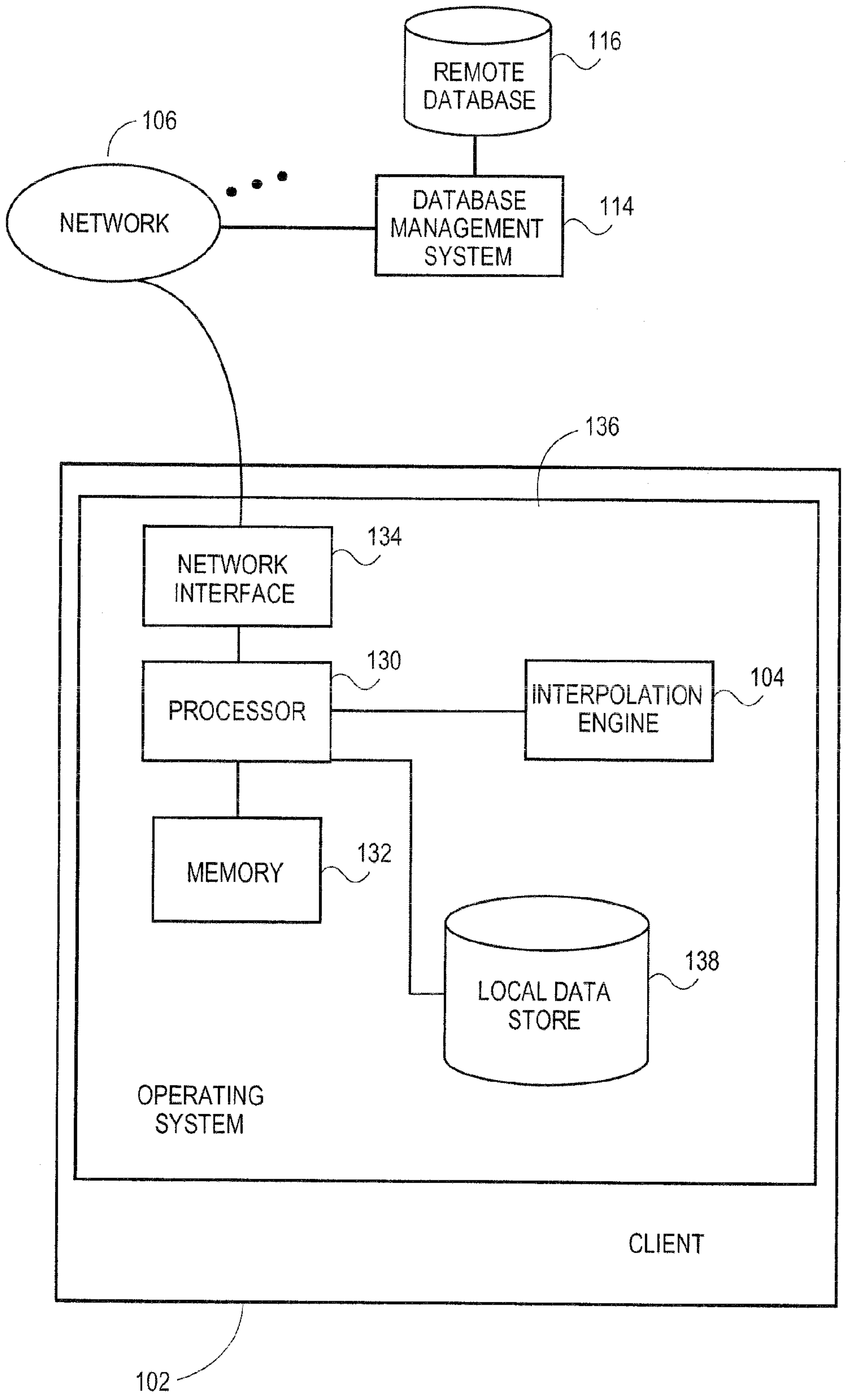
FIG. 4 illustrates an exemplary hardware configuration for client machine which can host or access systems and methods for generating interpolated input data sets using reduced input source objects, according to various embodiments.

In embodiments, and as generally shown in FIGS. 3A-3C, the interpolation engine 104 and/or other logic and operations can operate on the set of predetermined input data 124 to reduce the number of data objects contained in the set of predetermined input data 124, and/or to reduce the number of total dimensions of the set of predetermined input data 124 before performing interpolation operations. In aspects, reducing or decimating the set of predetermined input data 124 may be useful or desirable for different purposes and/or under different operational scenarios. In aspects in one regard, the reduction of the set of predetermined input data 124 in data objects and/or dimensions may be helpful in situations to reduce the computational overhead with which the interpolation engine 104 is burdened. This may be the case, for example, where the set of predetermined input data 124 is multi-dimensional, as illustrated in FIG. 3A (in three dimensions, although other numbers of dimensions may be used). In aspects, computing or generating the interpolation function 140, the set of interpolated input data 126, and/or other functions, variables, values, or outputs can become processor-intensive when the conformance and other characteristics of multiple dimensions must be extensively or exhaustively examined. The computational load on the interpolation engine 104 and/or other logic can also be increased in cases where the set of predetermined input data 124 is not necessarily encoded in three (or more) dimensions, but when the total number or length of individual lists, rows, and/or columns is comparatively large, such as on the order of thousands, tens of thousands, and/or other numbers of objects or values. In those and other scenarios in which interpolated inputs are desired, the operation of the overall platform including the interpolation engine 104 and/or other logic may be made more efficient and/or otherwise improved by generating a reduction in data objects and/or dimensions encoded in the set of predetermined input data 124, if a reduced image of that data can be developed which still satisfactorily models the interpolation behavior of the complete complement of data and/or dimensions reflected in the set of predetermined input data 124.

Similarly, in other aspects, regardless of the overall size and computational burden associated with the set of predetermined input data 124, in cases it may be true that some data objects and/or dimensions of the set of predetermined input data 124 may include data which tends to distort, degrade ,and/or otherwise affect the quality of accuracy of the set of interpolated input data 126, the interpolation function 140, or other outputs generated by the interpolation engine 104. This can be the case where one or more data objects or dimensions of the set of predetermined input data 124 include a numerical error or corruption. This can also be the case where data objects or dimensions of the set of predetermined input data 124 include data which are numerically accurate, but which represent outlying or abberational data points which tend to drive the interpolation function 140, set of interpolated input data 126, and/or other outputs or products toward a skewed result. In these and other scenarios, the reduction and/or other treatment or rationalization of the set of predetermined input data 124 can enhance the integrity and/or efficiency of interpolation operations.

In those regards, and as for instance shown in FIG. 3B, the interpolation engine 104 and/or other logic or mechanisms can be used to reduce the data objects and/or dimensions of the set of predetermined input data 124, to generate a set of reduced predetermined input data 160. The interpolation engine 104 and/or other logic can generate, receive, and/or produce the set of reduced predetermined input data 160 in a variety of ways, after which the interpolation engine 104 can operate on the set of reduced predetermined input data 160 to conduct interpolation operations as generally described herein, and produce a set of interpolated input data 126 based on that reduced input set. In aspects, the interpolation engine 104 and/or other logic can operate on the original set of predetermined input data 124, such as a three-dimensional data object shown in FIG. 3A, and generate a set of reduced predetermined input data 160 having a reduced number of rows and columns to effectively eliminate a block of data objects or sets of blocks of data objects, to derive a smaller three-dimensional data object as the set of reduced predetermined input data 160 as shown in FIG. 3B. In aspects, the set of reduced predetermined input data 160 can then be accessed by the interpolation engine 104 and/or other logic to produce a set of interpolated input data 126, again as described herein. While the set of reduced predetermined input data 160 illustrated in FIG. 3B shows the removal of a number of rows and columns from the original set of predetermined input data 124, it may be noted that the reduction can comprise the removal of entire dimensions of the set of predetermined input data 124, such as to remove planes or "slices" of set of predetermined input data 124 along an arbitrary axis of that data object. Similarly, which FIG. 3B illustrates the reduction of a number of rows, columns, and depth planes in contiguous fashion, in aspects any contiguous or non-contiguous data objects, columns, rows, planes, and/or dimensions can be reduced or eliminated. In aspects, the removal or reduction can likewise or instead be effected by inserting values of zero or other null entries or values into the location of a data object, row, column, plane, and/or dimension.

In aspects as generally shown in FIG. 3C, after developing the set of reduced predetermined input data 160, the interpolation engine 104 can perform further operations on the resulting set of interpolated input data 126 produced by that reduced input object to verify and/or validate or characterize the nature of the results reflected in the corresponding set of interpolated input data 126. More particularly, in aspects as shown, the interpolation engine 104 can generate and compare a set of interpolated series 128 based on different interpolated inputs, including the set of interpolated inputs 126 generated based on the original, full-dimensional or full data object set of predetermined input data 124 against the one or more sets of interpolated inputs 126 based on one or more sets of reduced predetermined input data 160. In aspects, the interpolation engine 104 and/or other logic can compare the entire list or collection of set of interpolated input data 126 to the baseline values of individual interpolated input values produced or generated by the original, full data object/dimensional set of predetermined input data 124. In aspects, that is, the interpolation engine 104 can determine a difference or deviation between performing interpolation operations on the original unreduced set of predetermined input data 124 to performing the same operations on one or more set of reduced predetermined input data 160 based on the same set of target output 120, to determine how closely the resulting interpolation function 140 and/or other output values approximate or conform to those same values produced using the full complement of the original set of predetermined input data 124. In aspects, the interpolation engine 104 can compute or generate a series output margin 164 capturing those or other metrics representing the difference between the set of predetermined input data 124 based on using the one or more sets of set of reduced predetermined input data 160 compared to using the original set of predetermined input data 124. In embodiments, the interpolation engine 104 can also apply a conformance limit 166 to the series output margin 164 to identify any one or more sets of reduced predetermined input data in the set of reduced predetermined input data 160 which produce set of interpolated input data 126 within a desired tolerance or range of the same results produced by the original full-complement set of predetermined input data 124. In aspects, the conformance limit 166 can be selected or inputted by a user, and/or can be generated using automated and/or statistical metrics, such as a maximum deviation of any interpolated predetermined input from the value for the same input variable produced using the original set of predetermined input data 124. Other thresholds, filters, and/or criteria can be used in the conformance limit 166.

Figure 5:
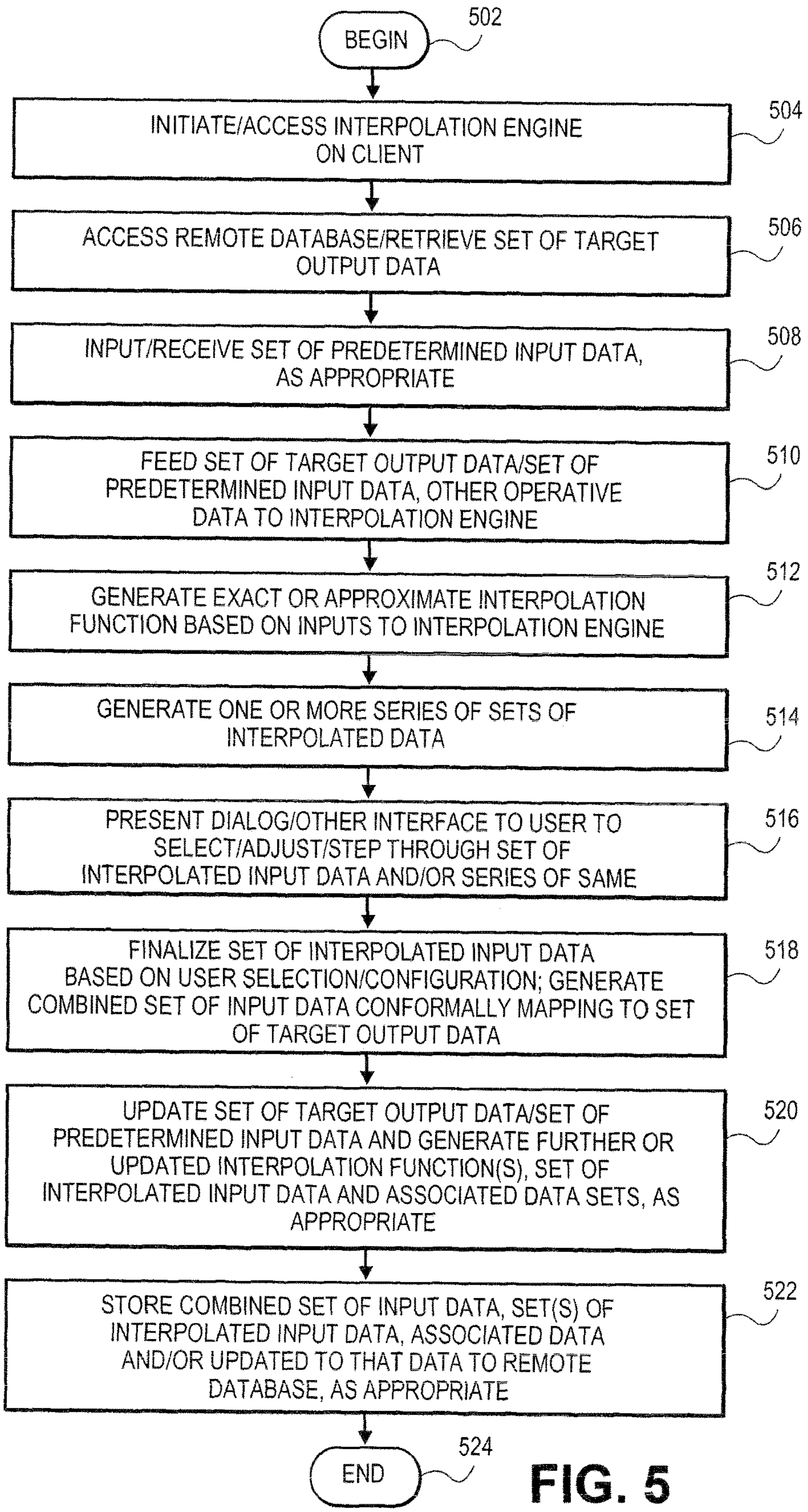
FIG. 5 illustrates a flowchart for overall interpolation, function determination, and other processing that can be used in systems and methods for generating interpolated input data sets using reduced input source objects, according to various embodiments.

FIG. 5 illustrates a flowchart of overall processing to generate interpolation functions, sets of interpolated data, and other reports or information, according to various embodiments of the present teachings. In 502, processing can begin. In 504, a user can initiate and/or access the interpolation engine 104 on client 102, and/or through other devices, hardware, or services. In 506, the user can access the remote database 116 via the database management system 114 and retrieve the set of target output data 120 and/or other associated data or information. In 508, the interpolation engine 104 can input or receive the set of predetermined input data 124, as appropriate. In embodiments, the set of predetermined input data 124 can be received via a selection dialog 112 from the user or operator of client 102. In embodiments, the set of predetermined input data 124 can in addition or instead be retrieved from the set of operative data 116 stored in remote database 116, and/or other local or remote storage or sources. In aspects, the set of predetermined input data 124 can be or include data that is already known or predetermined, which has a precise target value, or whose value is otherwise fixed. For instance, in cases where the set of operative data 118 relates to an undersea oil reserve in a hydrology study, the total volume of oil stored in a reservoir can be known or fixed, and supplied as part of the set of predetermined input data 124 by the user or by retrieval from a local or remote database. In 510, the set of target output data 120, the set of predetermined input data 124, and/or other data in set of operative data 118 or other associated data can be fed to interpolation engine 104.

In 512, the interpolation engine 104 can generate the interpolation function 140 as an exact or approximate function that will generate output conforming to the set of target output data 120, as an output. In aspects, the interpolation function 140 can be generated using techniques such as, for instance, perturbation analysis, curve fitting analysis, other statistical analysis, linear programming, and/or other analytic techniques. In aspects, the interpolation function 140 can be generated to produce an approximation to the set of target output data 120, or can be generated to generate an approximation to set of target output data 120 to within an arbitrary or specified tolerance. The interpolation function 140 can also, in aspects, be generated to produce set of target output data 120 with the highest degree of available accuracy. In 514, the interpolation engine 104 can generate one or more subsets of interpolated input data 126, and/or one or more set of interpolated series 128 containing individual different combinations of subsets of interpolated input data 126. In aspects, the set of interpolated input data 126 and/or series of interpolated input sets 128 can be generated by applying the set of target output data 120 to the set of predetermined input data 124 and filling in values in the set of interpolated input data 126 which produce an output which conforms to the set of target output data 120, exactly or to within a specified tolerance range. In aspects, the set of interpolated input data 126 and/or series of interpolated input sets 128 can be generated by producing sets of possible interpolated inputs which are then presented to the user via the selection dialog 112, for instance to permit the user to accept, decline, or modify the values of set of interpolated input data 126 and/or series of interpolated input sets 128.

In 516, the interpolation engine 104 can present the selection dialog 112 to the user to select, adjust, step through, and/or otherwise manipulate the set of interpolated input data 126 and/or series of interpolated input sets 128, for instance to allow the user to view the effects or changing different interpolated input values in those data sets. For example, in a case where the set of operative data 118 relates to financial budgets for a corporation, the user may be permitted to manipulate the selection dialog 112 to reduce the funded budget amount for one department, resulting in or allowing an increase in the budget amounts for a second department or to permit greater investment in IT (information technology) upgrades in a third department. In aspects, the selection dialog 112 can permit the adjustment of the set of interpolated input data 126 and/or series of interpolated input sets 128 through different interface mechanisms, such as slider tools to slide the value of different interpolated inputs through desired ranges. In 518, the user can finalize the set of interpolated input data 126, and the interpolation engine 104 can generate the resulting combined set of input data 122 which conformally maps to the set of target output data 120. In 520, the set of target output data 120, set of predetermined input data 124, and/or other information related to the set of operational data 116 and the analytic systems or phenomena being analyzed can be updated. The interpolation engine 104 and/or other logic can generate a further or updated interpolation function 140, a further or updated set of interpolated input data 126, and/or an update to other associated data sets in response to any such update to the set of target output data 120 and/or set of predetermined input data 124, as appropriate. In 522, the combined set of input data 122, the set of interpolated input data 126, the series of interpolated input sets 128, the interpolation function 140, and/or associated data or information can be stored to the set of operative data 118 in the remote database 116, and/or to other local or remote storage. In 524, as understood by persons skilled in the art, processing can repeat, return to a prior processing point, jump to a further processing point, or end.

Figure 6:
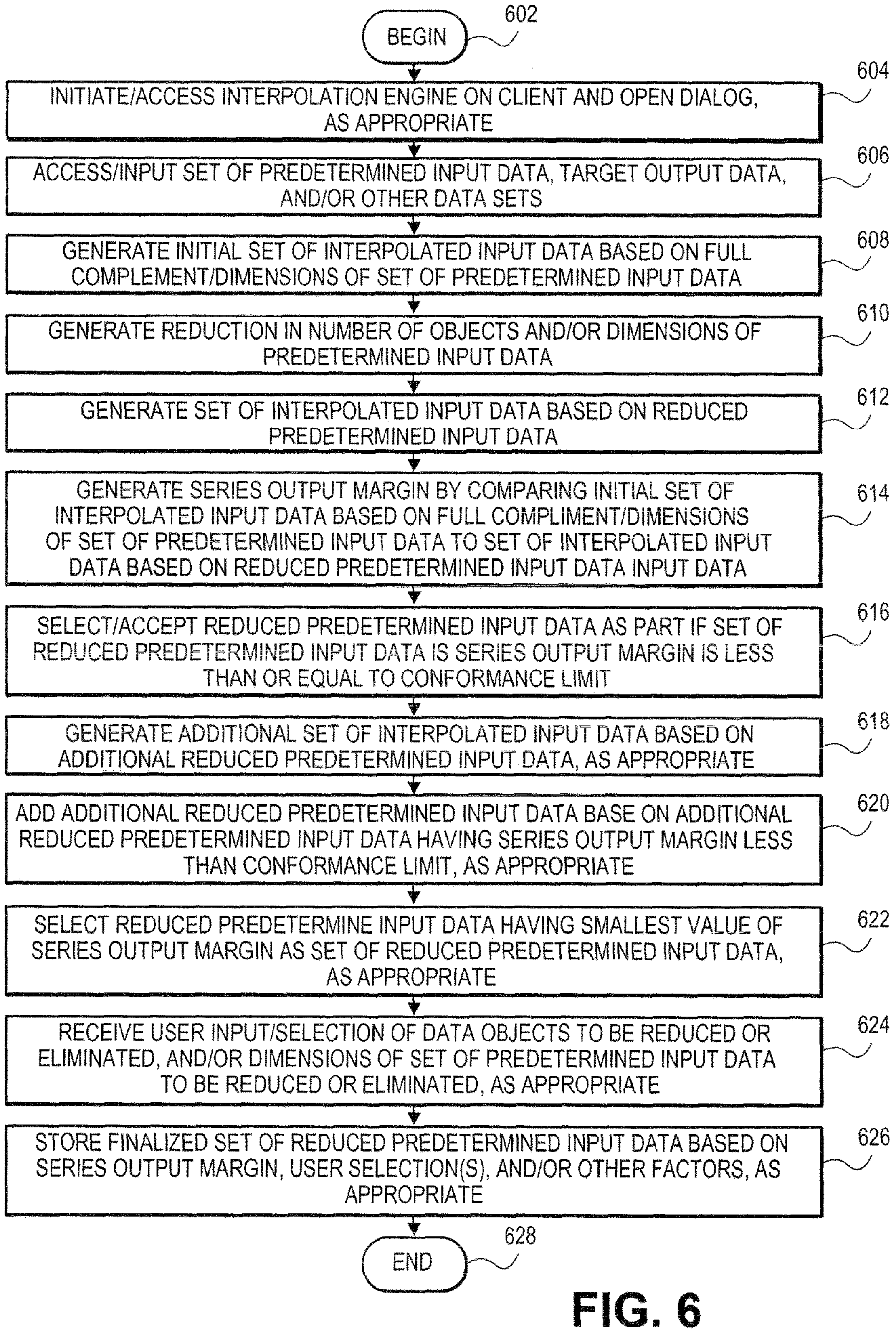
FIG. 6 illustrates a flowchart for operations related to object number and/or dimension reduction of predetermined input data, and other processing that can be used in systems and methods for generating interpolated input data sets using reduced input source objects, according to various embodiments.

FIG. 6 illustrates various aspects of present teachings, by which processing can be performed on the set of predetermined input data 124 and/or other data objects to generate a set of reduced predetermined input data 160 and/or other outputs, as desired. In 602, processing can begin. In 604, a user can initiate and/or access the interpolation engine 104 and/or other logic on client 102 and open selection dialog 112, as appropriate. In 606, the user can access and/or input the set of predetermined input data 124, the set of target output data 120, and/or other data or information. In 608, the interpolation engine 104 and/or other logic can generate a set of interpolated input data 126 based on the full complement, dimensions, or extent of the set of predetermined input data 124. In 610, the interpolation engine 104 and/or other logic can generate reduced predetermined input data 162 by performing a reduction or decrease in the number of objects and/or dimensions of the set of predetermined input data 124. In aspects, for instance, the interpolation engine 104 and/or other logic can reduce the number of data objects, values, or entries in a list, column, and/or matrix encapsulating the set of predetermined input data 124. In aspects, and as for instance illustrated in FIGS. 3A and 3B, the interpolation engine 104 and/or other logic can reduce the number of rows, columns, slices, and/or planes of a set of predetermined input data 124 which is encoded in a three-dimensional data structure, resulting in a smaller three-dimensional (cube-formatted) data object. In aspects, for further instance, the interpolation engine 104 and/or other logic can reduce the actual number of dimensions of the set of predetermined input data 124. For instance, the interpolation engine 104 and/or other logic can reduce a three-dimensional representation of the set of predetermined input data 124 to a two-dimensional representation of the set of predetermined input data 124. Other reductions, decreases, decimations, and/or alterations of the content, structure, organization and/or format of the set of predetermined input data 124 can be performed.

In 612, the interpolation engine 104 and/or other logic can generate a set of interpolated input data 126 based on the reduced predetermined input data 162. In 614, the interpolation engine 104 and/or other logic can generate a series output margin 164 by comparing the set of interpolated input data 126 generated based on the full set of predetermined input data 124 to the set of interpolated input data 126 based on the reduced predetermined input data 162. In aspects, the comparison can include the subtraction of the data points for interpolated variables in the two set of interpolated input data 126 data sets. In aspects, the comparison result in a single numerical value, such as the total difference or deviation of the one set of interpolated input data 126 from the other, and/or other comprise a list, matrix, and/or other data output reflecting the degree of difference between those two interpolated values. In 616, the interpolation engine 104 and/or other logic can select, identify, and/or accept the reduced predetermined input data 162 as part of the set of reduced predetermined input data 160 if the series output margin 164 is less than or equal to a conformance limit 166, such as 5% or other percentage, figure, ratio, and/or value.

The conformance limit 166 can represent, in aspects, the threshold or limit within which the substitution of reduced predetermined input data 162 and/or set of reduced predetermined input data 160 can satisfactorily replace the full complement of the set of predetermined input data 124. In aspects, the substitution of reduced predetermined input data 162 and/or set of reduced predetermined input data 160 for the full complement of the set of predetermined input data 124 can reduce computational complexity of the interpolation function 140 and/or other functions, calculations, and/or logic used by interpolation engine 104. In aspects, that substitution can likewise improve the accuracy of the interpolation function 140, for instance by removing data objects, segments, and/or dimensions which tend to distort or skew the interpolation function 140. In aspects, the conformance limit 166 can be selected and/or inputted by the user, and/or computed based on statistical measure, such as a limit or ceiling on the variance between the two set of interpolated input data 126, and/or other quantities or factors.

In 618, the interpolation engine 104 and/or other logic can generate an additional one or more sets of interpolated input data 124 based on additional reduced predetermined input data 162, as appropriate. For instance, the interpolation engine 104 and/or other logic can proceed to reduce or remove an additional or different column of predetermined input data from the set of predetermined input data 124, on a random or programmed basis. In 620, the interpolation engine 104 can add additional reduced predetermined input data 162 to the set of reduced predetermined input data 160 based on on additional reduced predetermined input data 162 having a series output margin 164 less than the conformance limit 166, as appropriate. In 622, the interpolation engine 104 can select the reduced predetermined input data 162 having the smallest value of series output margin 164 as the set of reduced predetermined input data 160, as appropriate. In aspects, it may be noted that instead of selecting only the reduced predetermined input data 162 generating the smallest output margin 166, the interpolation engine 104 can instead select or retain all reduced predetermined input data 162 producing a series output margin 164 less than the conformance limit 166. In 624, the interpolation engine 104 and or other logic can receive user input and/or selection(s), for instance via selector dialog 112, of alternative and/or additional data objects to be reduced or eliminated, and/or entire dimensions of the set of predetermined input data 124 to be reduced or eliminated, as appropriate. In 626, the interpolation engine 104 can store the finalized set of reduced predetermined input data 160 based on the series output margin 164, user selection(s), and/or other factors, as appropriate. In 628, as understood by persons skilled in the art, processing can repeat, return to a prior processing point, jump to a further processing point, or end.

The foregoing description is illustrative, and variations in configuration and implementation may occur to persons skilled in the art. For example, while embodiments have been described in which the interpolation engine 104 comprises a single application or set of hosted logic in one client 102, in embodiments the interpolation and associated logic can be distributed among multiple local or remote clients or systems. In embodiments, multiple interpolation engines can be used. Similarly, while embodiments have been described in which the set of operative data 118 is accessed via one remote database management system 114 and/or a remote database 116 associated with the remote database management system 114, in embodiments, the set of operative data 118 and associated information can be stored in one or multiple other data stores or resources, including in local data store 138 of client 102. Other resources described as singular or integrated can in embodiments be plural or distributed, and resources described as multiple or distributed can in embodiments be combined. The scope of the invention is accordingly intended to be limited only by the following claims.

What is claimed:

1. A method, comprising:

receiving a multi-dimensional input data object;

receiving output data;

presenting a selection dialog via a user interface, the selection dialog comprising a first interface element and a second interface element;

receiving a selection of the first interface element, the selection comprising an adjustment to the input data object;

generating, by a processor and in view of the adjustment, reduced input data from the input data object by removing, from along an axis of the input data object, a plane of data that distorts an interpolation function with respect to the input data object, wherein generating the reduced input data reduces computational overhead on the processor with respect to computing the interpolation function;

generating first interpolated input data in view of the input data object and the output data;

generating, by the processor, second interpolated input data in view of the reduced input data and the output data, the second interpolated input data being generated to conformally map a combination of the reduced input data and the first interpolated input data to the output data, wherein by generating the reduced input data the processor generates the second interpolated input data more efficiently than generating the second interpolated input data in view of the input data object; and in response to receipt of a selection of the second interface element, accepting the reduced input data in view of a determination that the second interpolated input data is within a series output margin of the first interpolated input data.

2. The method of claim 1, wherein the input data object has at least two dimensions.

3. The method of claim 2, wherein the reduced input data has a smaller number of data objects than the input data object in at least one of the at least two dimensions.

4. The method of claim 3, wherein the reduced input data has at least one less dimension than the input data object.

5. The method of claim 1, wherein generating the second interpolated input data comprises generating a plurality of sets of second interpolated input data, each of the plurality of sets being generated in view of the output data and different reduced input data.

6. The method of claim 5, further comprising selecting a set of second interpolated input data having a least smallest series output margin as part of the reduced input data.

7. The method of claim 1, wherein generating the reduced input data comprises receiving user input selecting at least one of a number of data objects to be reduced in the input data object or one or more dimensions to be reduced in the input data object.

8. The method of claim 1, wherein the input data object comprises at least one of financial data, medical data, demographic data, engineering data, network operations data, or geographic data.

9. The method of claim 1, wherein at least one of the output data or the input data object are accessed from a database management system remote to a client machine operated by a user.

10. A system, comprising:
- an interface to a database to store an input data object and output data; and
- a processor, operatively coupled with the database, to:
  - receive multi-dimensional input data;
  - receive output data;
  - generate reduced input data from the input data object via removal, from along an axis of the input data object, of a plane of data that distorts an interpolation function with respect to the input data object, wherein to generate the reduced input data reduces computational overhead on the processor with respect to a computation of the interpolation function;
  - generate first interpolated input data in view of the input data object and the output data;
  - generate second interpolated input data in view of the reduced input data and the output data, the second interpolated input data being generated to conformally map a combination of the reduced input data and the first interpolated input data to the output data, wherein generation of the reduced input data enables the processor to generate the second interpolated input data more efficiently than to generate the second interpolated input data in view of the input data object; and
  - accept the reduced input data in view of a determination that the second interpolated input data is capable of producing a result comparable in accuracy to the first interpolated input data.

11. The system of claim 10, wherein the input data object has at least two dimensions.

12. The system of claim 11, wherein the reduced input data has a smaller number of data objects than the input data object in at least one of the at least two dimensions.

13. The system of claim 12, wherein the reduced input data has at least one less dimension than the input data object.

14. The system of claim 10, wherein to generate the second interpolated input data is to generate a plurality of sets of second interpolated input data, each set of the plurality of sets of second interpolated input data being generated in view of the output data and different reduced input data.

15. The system of claim 14, wherein the processor is further to select a set of second interpolated input data having a smallest series output margin as part of the reduced input data.

16. The system of claim 10, wherein to generate the reduced input data is to receive user input that selects at least one of a number of data objects to be reduced in the input data object or one or more dimensions to be reduced in the input data object.

17. The system of claim 10, wherein the input data object comprises at least one of financial data, medical data, demographic data, engineering data, network operations data, or geographic data.

18. The system of claim 10, wherein at least one of the output data or the input data object are accessed from a database management system remote to a client machine operated by a user.

19. A non-transitory computer-readable storage medium having instructions encoded thereon which, when executed by a processor, cause the processor to:
- receive a multi-dimensional input data object;
- receive output data;
- generate, by the processor, reduced input data from the input data object via removal, from along an axis of the input data object, of a plane of data that distorts an interpolation function with respect to the input data object, wherein to generate the reduced input data reduces computational overhead on the processor with respect to a computation of the interpolation function;
- generate first interpolated input data in view of the input data object and the output data;
- generate second interpolated input data in view of the reduced input data and the output data, the second interpolated input data being generated to conformally map a combination of the reduced input data and the first interpolated input data to the output data, wherein generation of the reduced input data enables the processor to generate the second interpolated input data more efficiently than to generate the second interpolated input data in view of the input data object; and
- accept the reduced input data in view of a determination that the second interpolated input data is within a series output margin of the first interpolated input data.

20. The non-transitory computer-readable storage medium of claim 19, wherein to generate the second interpolated input data is to generate a plurality of sets of second interpolated input data, each set of the plurality of sets being in view of the output data and different reduced input data.

* * * * *